April 5, 1938.  H. Y. STEBBINS  2,113,359

FREEZING APPARATUS

Filed March 23, 1936  3 Sheets-Sheet 1

Inventor:
Harry Y. Stebbins,
By Dyrenforth, Lee, Chritton & Wiles
Attys.

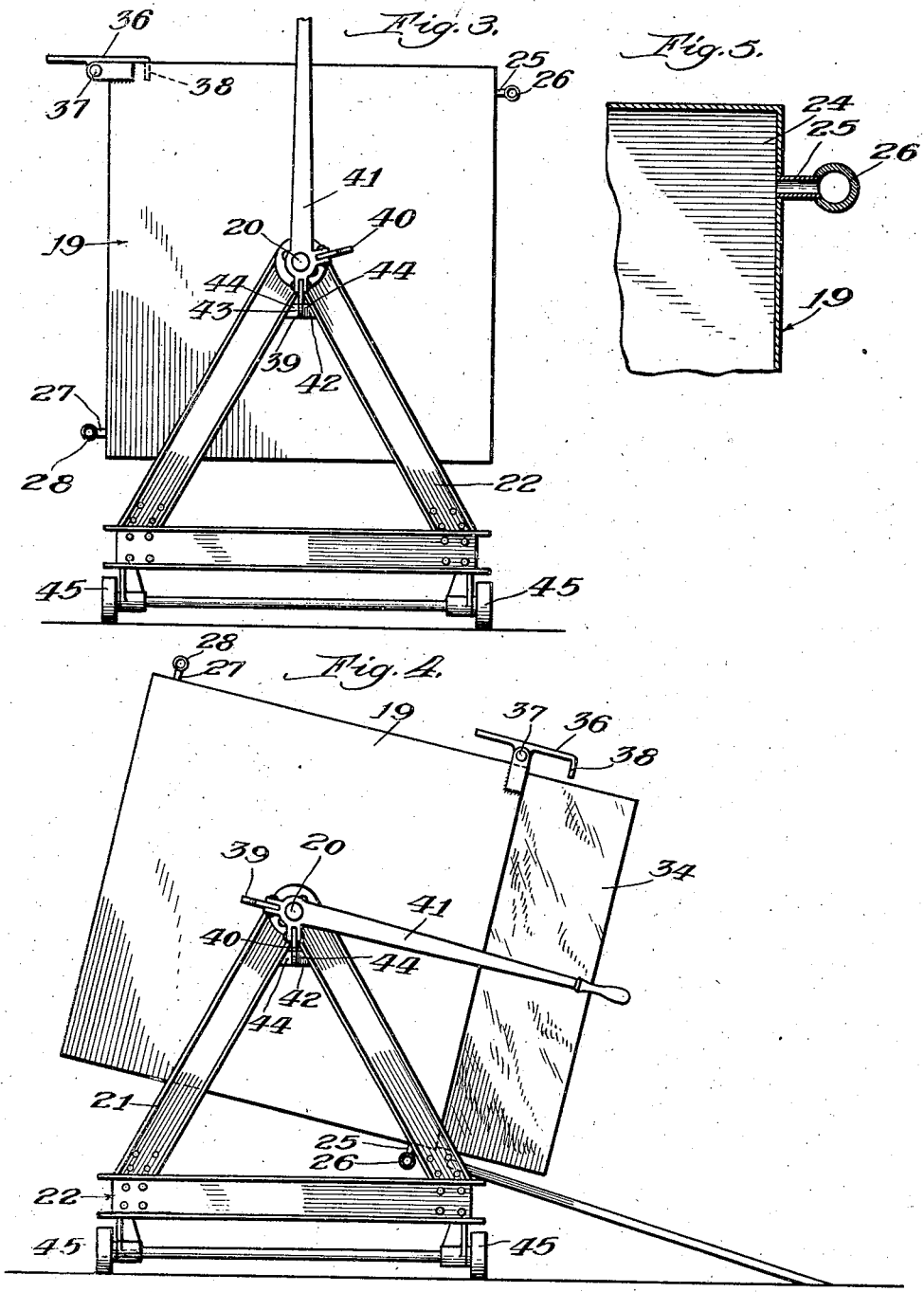

April 5, 1938.  H. Y. STEBBINS  2,113,359
FREEZING APPARATUS
Filed March 23, 1936  3 Sheets-Sheet 3

Inventor:
Harry Y. Stebbins
By Dyrenforth, Lee, Chritton & Wiles
Attys.

Patented Apr. 5, 1938

2,113,359

UNITED STATES PATENT OFFICE 2,113,359

FREEZING APPARATUS

Harry Y. Stebbins, Chicago, Ill., assignor to General American Precooling Corporation, Chicago, Ill., a corporation of Delaware Application March 23, 1936, Serial No. 70,515

1 Claim. (Cl. 62—108)

My invention as to one phase thereof relates to a novel conception of supplying refrigeration, such as for example to produce ice, to users thereof, as for instance to occupants of houses for use for household purposes and air conditioning, and tradesmen requiring ice for air-conditioning and refrigeration of articles; and as to another phase thereof to apparatuses in which cakes of ice or other frozen commodities are produced.

As to the first-referred-to phase of my invention, my primary object is to provide for the economical production of ice or other frozen commodity at the several locations of use by a servicing plan involving the supplying of the refrigerating medium, necessary to produce the ice or other frozen commodity, from trucks equipped with refrigerating-medium supplying means.

As to the other phase of my invention my primary objects are as follows:

To provide for the economical production of ice cakes or other frozen commodities; to provide a form of apparatus whereby the frozen bodies may be readily removed from the apparatus, preferably either simultaneously or selectively, as desired; to provide for the so positioning of the part of the apparatus in which the ice cakes are formed that the maximum efficiency of the ice, as refrigerating means, may be obtained in the use of the apparatus for air conditioning; to provide a simplified construction of ice making apparatus of the can type whereby the employment of a tank having a permanent location and expensive to build and lifting devices for withdrawing the ice cakes from the cans, are avoided; to provide a construction of ice making apparatus which may be used in places where ice plants of the can type, as commonly provided, would be impracticable and whereby the ice, or other frozen bodies, may be made at one location and moved with the apparatus in which they are made, and thus without re-handling, to another distant location for any desired use as for example in the case of ice cakes, for the icing of railroad refrigerator cars.

Referring to the accompanying drawings:

Figure 1 is a view in side elevation, partly sectional, of a construction of refrigerating apparatus in accordance with one phase of my invention.

Figure 2 is a plan view of the apparatus of Fig. 1.

Figure 3 is an end view of the apparatus of Fig. 1, the apparatus in these three figures being shown in the position it occupies during the freezing operation.

Figure 4 is a view like Fig. 3 showing the apparatus in position for discharging the frozen bodies therefrom.

Figure 5 is a broken fragmentary sectional view of a portion of the apparatus, the view being taken at the line 5 on Fig. 1 and viewed in the direction of the arrow.

In accordance with the first-referred-to phase of my invention I provide at each location to be serviced, such as for example buildings at different locations, freezing apparatuses employing a fluid refrigerating medium, such as refrigerated brine, and provided, as for example, for the making of ice cakes or producing other frozen bodies, these several apparatuses having connections for coupling thereto supply and return pipes leading from any suitable apparatus for producing such cooling fluid mounted on a truck and thus rendered readily portable for servicing selectively such freezing apparatuses.

As will be understood, the apparatus mounted on the truck, represented at 9, for supplying the cooled refrigerating medium, may be of any suitable construction and is represented diagrammatically at 10, the hose lines for delivering the refrigerating medium to the freezing apparatuses selectively and returning it to the apparatus 10 for re-cooling, being represented at 11 and 12, respectively.

Likewise the freezing apparatuses located in the several buildings to be serviced by the truck 9, may be of any desirable construction, the supply and return lines 11 and 12 in the servicing operation being connected with the freezing apparatus to be serviced at its inlet and outlet connections thus establishing a closed circuit for the refrigerating medium which, in circulating through the freezing apparatus, produces the desired ice cakes or other frozen objects.

In the arrangement shown one only of the buildings to be serviced and represented at 13, is illustrated, the freezing apparatus therein being provided as a part of an air conditioning apparatus for the building located in the basement thereof and represented at 14, the hose lines 15 and 16, connecting with the freezing apparatus, being releasably connected at 17 and 18, respectively, with the refrigerating medium supply and return pipes 11 and 12 of the refrigerating-medium-cooling apparatus 10.

Figure 6:
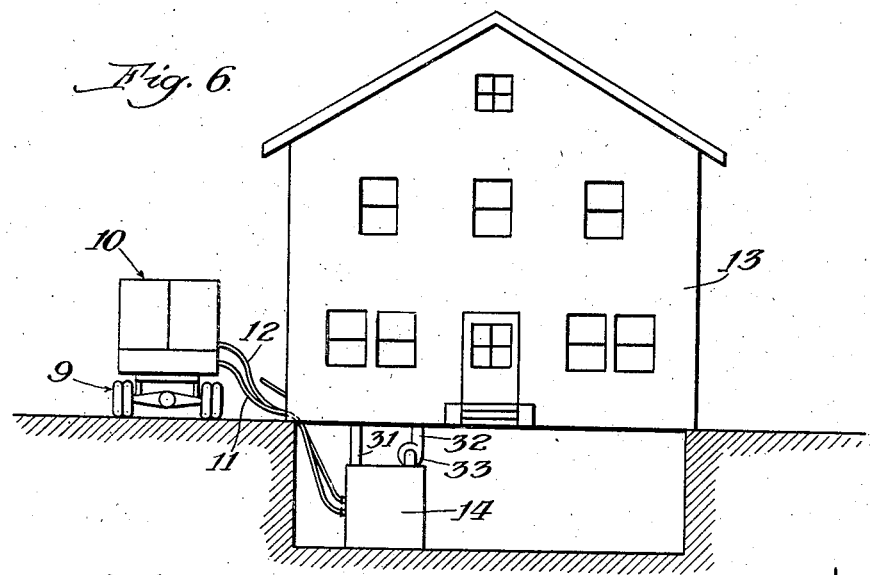
Figure 6 is a view somewhat in the nature of a diagram, illustrating an embodiment of my invention in accordance with the first-referred-to phase thereof.
Figure 7:
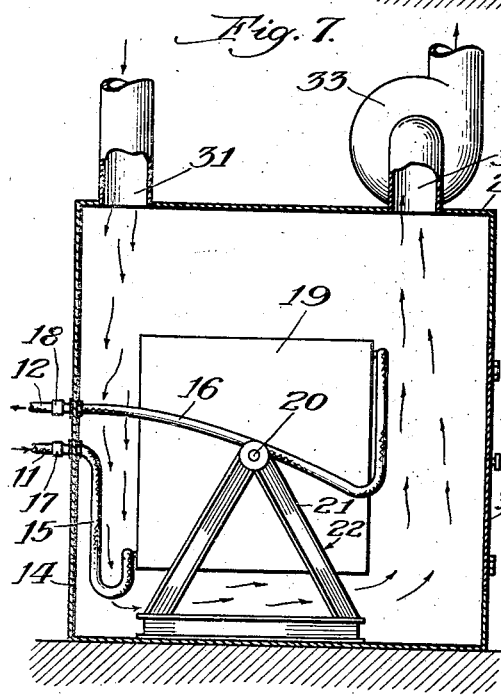
Figure 7 is a view in sectional elevation of freezing apparatus embodying my invention and which may be used in the practice of my invention in accordance with the showing in Fig. 6.
Figure 8:
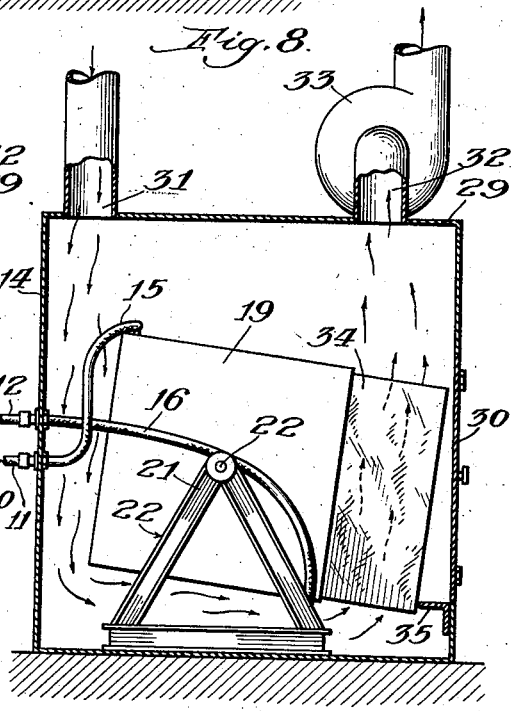
Figure 8, a similar view of another form in which the freezing apparatus may be provided.

It is preferred that the freezing apparatuses referred to be of a construction in accordance with the second above-referred-to phases of my invention which contemplates, preferably, the provision of a tank, or receptacle, structure, represented generally at 19, mounted at trunnions 20 on its ends in the space between upright spaced apart portions 21 of a supporting frame 22, adapting the tank structure 19 to be swung from the upright position shown in Figs. 1–3 and 7, to the substantially inverted position shown in Figs. 4 and 8 for the purpose hereinafter explained.

The tank 19 comprises, as more clearly shown in Figs. 1, 2 and 5, a series of upwardly opening, preferably narrow, generally rectangular, compartments 23 extending crosswise of the tank and downwardly tapering as shown, and a series of chambers 24 alternating with the compartments 23 and each completely closed except for inlets 25 at one side of the tank, from an inlet manifold 26, and outlets 27, at the other side of the tank, to an outlet manifold 28.

The chambers 24 are provided for circulation therethrough of the refrigerating fluid, the cooled fluid entering the manifold 26 which is preferably connected with the chambers 24 at the inlets 25 adjacent the upper end of these chambers, thence flowing through these chambers to freeze the water or other material charged into the compartments 23, the warmed refrigerant discharging from the chambers 24 through the outlets 27 preferably located near the bottom of these chambers, to the manifold 28 and back to the refrigerant cooling apparatus to recondition the fluid for further cooling.

If desired, instead of discharging the refrigerant directly into the chambers 24 the refrigerant may be circulated through pipe coils (not shown) located in these chambers and connected at their opposite ends with the refrigerant inlets 24 and outlets 25.

The tank 19 and the supporting structure 22 therefor, are enclosed in a housing 29 having a door 30 in one of its side walls, an inlet 31 in its top wall through which the air to be conditioned flows from the space in the interior of the building to be cooled, into the housing 29, and an outlet 32 in its top wall through which the air cooled in the housing 29 flows for circulation through the space to be cooled, a blower 33, as for example installed in the outlet of the housing 29, being provided to effect the desired circulation of the air through the housing to the space to be cooled and back to the housing.

For air conditioning, the tank structure 19, after the freezing of the water in the compartments to produce ice cakes therein by refrigerating medium circulated through the chambers 24 by the refrigerating-medium-circulating means 10 on the truck, may be used in the position occupied by it about its axis of turning, in the filling of the compartments 23 with water as shown in Fig. 7, the flow of the air currents in the housing 29 being represented by the arrows in Fig. 7.

However, should it be desired to intensify the air cooling effect of the apparatus, it is desirable to position the ice cakes in the path of flow of the air in the housing 29. This is effected by turning the tank structure 19 on its trunnions 20 to partially inverted position, generally as shown in Fig. 4, in which position the ice cakes, shown at 34, may slide partially out of the compartments. When the apparatus is used in the manner just stated it is preferred that the housing 29 be provided with a stop portion 35, shown as an angle iron extending substantially across the full width of the housing adjacent the lower edge of the opening controlled by the door 30, this stop portion projecting into the path of movement of the cakes of ice as they slide toward discharging position in the compartments.

By such an arrangement, the ice as it melts, automatically feeds out of the compartments 23 thereby maintaining a substantially uniform extended surface for contact with the currents of air to be cooled.

When it is desired to entirely remove some or all of the ice cakes from the compartments 23, this may be done by access through the opening in the housing 29 controlled by the door 30.

When the freezing apparatus is used without a housing, such as the housing 29, or even if used with a housing, if desired, it is preferred that some means be provided for releasably holding the separate ice cakes 34 in the compartments in order that they may be selectively released for discharge. Figs. 1–4 show desirable means for this purpose comprising a series of levers 36 pivoted on a shaft 37 carried by the tank structure 19 and having lugs which in the normal upright position of the tank structure extend into the water in the compartments 23 and are thus frozen into embedding position in the formed ice cakes. The levers 36 thus serve to hold the ice cakes from discharging from the compartments but are readily released for permitting the ice cakes to slide from the compartments by striking the levers as with a hammer, to break the bonds between them and the ice.

The freezing apparatus may be provided with automatic latch means for holding the tank 19 in its normal upright position or in the desired partially inverted position. A construction of such means is shown in Figs. 1–4 and comprises a pair of gravity-actuated latch levers 39 and 40, pivoted on a lever 41 secured to one of the trunnions 20 and by which the tank structure may be swung into and out of normal upright position. The levers 39 and 40 cooperate with a keeper 42 on the frame 22 and having a recess 43 flanked by cam surfaces 44, the lever 39 extending into latched position within the recess 43 when the tank is in the normal upright position and the lever 40 extending into this recess when the tank is rotated to the ice-cake-discharging position shown in Figs. 4 and 8. The cam surfaces 44 act on the levers 39 and 40 to cause them to automatically enter the keeper-recess in alternation as the tank is rotated into and out of upright position.

When it is desired to displace the frozen bodies in the compartments 23 promptly after the conclusion of the freezing operation, it is necessary that the bond between such bodies and the walls of the compartments 23 be broken. This is accomplished in any desirable way, as for example by circulating any suitable comparatively warm fluid medium through the chambers 24, as for example the refrigerating fluid following the compressing thereof and while it is in relatively warm condition, when refrigerant-cooling apparatus employing a compressor is used.

In the structure shown in Figs. 1–4 the supporting frame 22 for the tank 19 is provided with wheels 45 to render the entire freezing apparatus readily portable and adapt it to be readily moved from one location to another, permitting the freezing operation to take place at one location and the frozen bodies to be transferred in the freezing apparatus, and without individual handling, to the location at which they are to be used, a feature which is of particular advantage in the icing of refrigerator cars.

As will be understood from the foregoing the freezing apparatuses serviced from a truck as stated need not, in accordance with my invention, be of a construction embodying the second-referred-to phase of my invention, and my improved freezing apparatus need not, within this phase of the invention, be used in connection with the truck means described for serving the freezing apparatus.

While I have illustrated and described certain particular embodiments of my invention, I do not wish to be understood as intending to limit it thereto as the same may be variously modified and altered and the invention embodied in other forms of construction without departing from the spirit of my invention. Furthermore, the method described may be practiced in other ways and with other forms of structure than those described and shown without departing from the spirit of my invention.

What I claim as new, and desire to secure by Letters Patent, is:

Freezing apparatus comprising a compartment for the material to be frozen, means for refrigerating the material in said compartment, said compartment being mounted for turning movement, for the purpose set forth and latch means pivotally mounted upon a wall of said compartment and dipping into the material to be frozen.

HARRY Y. STEBBINS.